United States Patent
Braybrook (10) Patent No.: US 11,205,079 B2
(45) Date of Patent: Dec. 21, 2021

(54) DETERMINING POSITION DATA

(71) Applicant: Ordnance Survey Limited, Southampton (GB)

(72) Inventor: Joseph Braybrook, Southampton (GB)

(73) Assignee: Ordnance Survey Limited, Southampton (GB)

( * ) Notice: Subject to any disclaimer, the term of this patent is extended or adjusted under 35 U.S.C. 154(b) by 71 days.

(21) Appl. No.: 16/700,058

(22) Filed: Dec. 2, 2019

(65) Prior Publication Data
US 2020/0193170 A1    Jun. 18, 2020

(30) Foreign Application Priority Data

Dec. 13, 2018 (EP) .................................... 18212310

(51) Int. Cl.
| | |
|---|---|
| *G06K 9/00* | (2006.01) |
| *G06T 7/32* | (2017.01) |
| *B60R 11/04* | (2006.01) |
| *H04N 5/232* | (2006.01) |

(52) U.S. Cl.
CPC .......... *G06K 9/00791* (2013.01); *B60R 11/04* (2013.01); *G06T 7/32* (2017.01); *H04N 5/23229* (2013.01); *B60R 2300/302* (2013.01); *B60R 2300/60* (2013.01); *G06T 2207/30252* (2013.01)

(58) Field of Classification Search
CPC .............................. G06K 9/00791; G01C 21/32
See application file for complete search history.

(56) References Cited

U.S. PATENT DOCUMENTS

| | | | |
|---|---|---|---|
| 6,175,802 B1 * | 1/2001 | Okude ................. | G09B 29/106 |
| | | | 701/431 |
| 2010/0310177 A1 | 12/2010 | Xiong et al. | |
| 2011/0090337 A1* | 4/2011 | Klomp ................. | G01C 11/025 |
| | | | 348/144 |
| 2014/0217178 A1* | 8/2014 | Zhou .................... | G06K 7/1417 |
| | | | 235/454 |
| 2018/0193698 A1 | 7/2018 | Case, Jr. et al. | |

FOREIGN PATENT DOCUMENTS

| | | |
|---|---|---|
| WO | 9849577 A2 | 11/1998 |
| WO | 2018104563 A2 | 6/2018 |

OTHER PUBLICATIONS

Jun. 28, 2019—(EP) Extended Search Report—App 18212310.9.

* cited by examiner

*Primary Examiner* — Jerry T Jean Baptiste
(74) *Attorney, Agent, or Firm* — Banner & Witcoff, Ltd.

(57) ABSTRACT

Aspects described herein relate to methods and systems for obtaining geographic position data for features that are captured through a device using a relative coordinate system, such as an optical sensor on a vehicle travelling along a route. The relative positions of the features are transformed into geographic positions by first establishing a spatial relationship between the relative coordinate system and a geographic coordinate system. Once the spatial relationship is known, it can be used to match a number of the features captured in the relative coordinate system to features having a known position within the geographic coordinate system, preferably, features that are known to have an accurately measured geographic position. The matched features can then be used as tie points between the relative coordinate system and the geographic coordinate system, and then used to transform unmatched features in the relative coordinate system to positions in the geographic coordinate system.

18 Claims, 8 Drawing Sheets

DETERMINING POSITION DATA

FIELD

Aspects described herein relate to computer implemented methods and systems for determining position data for geographic features. In particular, aspects described herein relate to a method of determining position data for geographic features located along a road based on a set of known features.

BACKGROUND

Most providers of digital maps rely on a very detailed topographical map database which stores the underlying data. For example, Ordnance Survey (a UK public corporation) uses the very large scale topographic product OS MasterMap®, which records every feature larger than a few metres in one continuous dataset, and is constantly being updated.

One technique used to obtain and update topographic data, specifically, topographic features located along roads and the like, is the use of simultaneous localisation and mapping (SLAM) techniques, which use vehicles comprising sensors such as optical sensors to capture the features of an unknown environment whilst tracking the relative location of the vehicle as it progresses along the route. For example, the optical sensor may capture a video from the front of the vehicle, with image processing being used to process the video to thereby 1) track the position and orientation of the vehicle over time, and 2) identify and position any features located along the route. In some cases, other sensors such as an inertial measurement unit (IMU) may be used improve the tracked position data over the vehicle. At the same time, the geographical position of the vehicle is tracked using a geographic navigation system such as the Global Positioning System (GPS) in order to match the features captured by the SLAM based sensor to a geographic coordinate.

Typically, the road data captured using SLAM techniques is in a relative, non-fixed, non-Euclidian coordinate system, which is susceptible to large amounts of drift whereby the difference between the measured location and the actual location gradually increases. Furthermore, the GPS receiver used to monitor the geographical position of the vehicle is susceptible to losing signal, particularly in remote areas, and the GPS data received is often very inaccurate, sometimes by as much as 10 metres.

One solution known in the art is Kalman filtering, which uses the GPS data to correct the drift of the SLAM data and obtain an overall more accurate position from the data it is applied to. However, this assumes that the GPS is both accurate and sustained, whereas in reality the GPS signal is regularly being lost or drifting erratically over substantial distances (for example, up to 45-50% in cities). As noted above, the SLAM data also drifts, which gets significantly worse whenever the vehicle turns, undergoes elevation change or speeds up. Therefore, due to the inaccuracies in both the GPS and SLAM data, the resulting feature data is also inaccurate to varying degrees.

SUMMARY

Embodiments and aspects described herein address the above noted problems by providing computer-implemented methods and systems for obtaining geographic position data for features that are captured through a device using a relative coordinate system, such as an optical sensor on a vehicle travelling along a route. The relative positions of the features are transformed into geographic positions by first establishing a spatial relationship between the relative coordinate system and a geographic coordinate system, for example, by comparing the route measured in the relative coordinate system to the same route measured in the geographic coordinate system by some form of satellite navigation system. Once the spatial relationship is known, it can be used to match a number of the features captured in the relative coordinate system to features having a known position within the geographic coordinate system, preferably, features that are known to have an accurately measured geographic position. The matched features can then be used as tie points between the relative coordinate system and the geographic coordinate system, which can then be used to transform unmatched features in the relative coordinate system to positions in the geographic coordinate system. For example, by triangulating two tie points and an unmatched feature in the relative coordinate system to find the angular relationship between these three relative positions, and then applying this angular relationship to the geographic positions of the tie points to identify the geographic position of the unmatched feature.

A first aspect described herein provides a computer-implemented method of determining a geographic position of a feature identified along a route travelled by a vehicle, the method comprising receiving a set of route data comprising a first route trajectory measured in a relative coordinate system, and a plurality of features having a position measured in the relative coordinate system, and receiving known topographic data comprising one or more known topographic features having a known position measured in a geographic coordinate system. The method then comprises the steps of determining a spatial relationship between the relative coordinate system and the geographic coordinate system, matching one or more features in the route data to one or more of the known topographic features in dependence on the determined spatial relationship to determine at least two tie points between the relative coordinate system and the geographic coordinate system, and transforming a position of one or more unmatched features in the route data from the relative coordinate system to the geographic coordinate system in dependence on the at least two tie points to thereby determine a geographic position of the one or more unmatched features.

The route data tracks the route that the vehicle is travelling, measured by a sensing or tracking means located on the vehicle. For example, the first route trajectory may correspond to the route travelled by the vehicle, measured as a position of the vehicle relative to its starting position. The position of each of the plurality of features may then be measured as a position relative to the position of the vehicle at a given time along the route, to thereby provide a position within the relative coordinate system. That is to say, based on the time that the vehicle started the route and/or the distance travelled since the vehicle began its route, the position of the vehicle can be tracked, along with the position of features located along the route that the vehicle is travelling.

A spatial relationship between the relative coordinate system defined by the vehicle tracking means and a known geographic coordinate system can then be derived, for example, by comparing part of the first route trajectory to a corresponding part of the route measured in geographic coordinates. For example, the set of route data may further comprise a second route trajectory measured in the geographic coordinate system, wherein the spatial relationship is determined in dependence on a part of the first route trajectory and a part of the second route trajectory, wherein the part of the first route trajectory and the part of the second route trajectory are both measured between a first time and a second time. The second route trajectory therefore corresponds to the same route travelled by the vehicle, measured as the geographic position of the vehicle, for example, by a device having satellite navigation capabilities located on the vehicle, or from a known set of geographic coordinates for the road(s) that the vehicle is travelling along. The spatial relationship between the two coordinate systems can then be determined by comparing a portion of the route tracked in the relative coordinate system to the same portion of the route tracked in the geographic coordinate system. As data from a satellite navigation system may only be required for determining the general spatial relationship between the two coordinate systems, the quality of this data does not impact the final transformation, and hence inaccuracies in this data, for example, a second route trajectory wandering off the actual route for small periods, will not have an effect on the accuracy of the final geographic position data obtained for the unmatched features.

For example, determining the spatial relationship may comprise calculating an angular offset between the part of the first route trajectory and the part of the second route trajectory. In this respect, the magnitude of the two parts may be preserved between the two coordinate systems, and hence the difference between the two parts is their orientation within their respective coordinate systems. The spatial relationship may therefore be the amount by which the part of the first route trajectory needs to be rotated within the geographic coordinate system so that it matches the orientation of the part of the second route trajectory.

Using this spatial relationship, it is then possible to match one or more of the features tracked by the vehicle to known topographic features, the accurate geographic position of which is known, also referred to as ground control points. For example, the matching may comprise transforming a position of a feature in the relative coordinate system to a position in the geographic coordinate system based on the angular offset, and comparing the position in the geographic coordinate system to the known positions of the one or more known topographic features. Again, as the magnitude of the distance from the first route trajectory to the feature is preserved between coordinate systems, a geographic position of the feature can be derived by applying the angular offset to the feature to find its location within the geographic coordinate system. This can then be compared to the known topographic data to identify any features having the same or approximately the same geographic position.

In some cases, the calculating the angular offset may comprise calculating a first vector between a first relative position on the part of the first trajectory corresponding to the first time and a second relative position on the part of the first trajectory corresponding to the second time, calculating a second vector between a first geographic position on the part of the second trajectory corresponding to the first time and a second geographic position on the part of the second trajectory corresponding to the second time, adding the first vector to the first geographic position, and calculate an angle of rotation between the first and second vector. As before, the magnitude of the first vector is taken to be preserved within the geographic coordinate system, and hence the angular offset is calculated by rotating the first vector about the geographic position corresponding to the beginning of the part of the second route trajectory so until it matches the orientation of the second vector.

The matching may then further comprise calculating a third vector between the first relative position and a feature corresponding to a third relative position, adding the third vector to the first geographic position, rotating the third vector about the first geographic position by the angle of rotation, and determining a geographic position of the feature based on a magnitude of the third vector in the rotated orientation. As such, a vector is calculated based on the position of the feature relative to the starting point of the part of the first route trajectory, and then this vector and the angular offset is used to find the position of the feature relative to the starting pint of the part of the second route trajectory.

The method may further comprise identifying a gap in the second route trajectory, the gap corresponding to a first time duration, identifying a portion of the first route trajectory corresponding to the first time duration, and resolving the gap in the second route trajectory based on the portion of the first route trajectory. As the second route trajectory may be tracked by some sort of satellite navigation system on the vehicle, there is a possibility of gaps in the second route trajectory due to reasons such as poor signal. Where the second route trajectory is being used to determine the spatial relationship between the two coordinate systems, it is important that any gaps are resolved. This can be resolved using the first route trajectory, for example, by approximately transforming the respective part of the first route trajectory into the same units of the geographic coordinate system and inserting this approximation into the missing section of the second route trajectory.

As discussed above, once accurate tie points between the relative and geographic coordinate systems have been identified, these can be used to accurately identify the geographic location of features that have not already been matched. As the geographic positions of these tie points is known with high accuracy, it is possible to identify the geographic positions of the unmatched features within one metre of accuracy.

For example, the transforming may comprise identifying a first tie point and a second tie point in proximity to an unmatched feature, wherein the unmatched features is located between the first and second tie points in the direction of at least one axis of the relative coordinate system, and wherein a position of the first tie point and the second tie point is known in both the relative coordinate system and the geographic coordinate system. That is to say, one tie point will be behind the unmatched feature along the route, whilst another tie point will be in front of the unmatched feature along the route.

The transforming may comprises calculating a further spatial relationship between the unmatched feature and the positions of the first and second tie points in the relative coordinate system, applying the further spatial relationship to the positions of the first and second tie points in the geographic coordinate system, and determining a geographic position of the unmatched feature in dependence thereon. For example, the trigonometric relationship between the three points within the relative coordinate system may be derived, this trigonometric relationship then being applied to the two tie points within the geographic coordinate system to calculate the geographic position of the unmatched feature.

The transforming may further comprise first calculating a first transformation vector between the unmatched feature and a relative position of the first tie point, a second transformation vector between the unmatched feature and a relative position of the second tie point, and a third transformation vector between the relative positions of the first and second tie points, calculating a first transformation angle between the first transformation vector and the third transformation vector, and calculating a second transformation angle between the second transformation vector and the third transformation vector. A first geographic vector is then calculated between a geographic position of the first tie point and a geographic position of the second tie point, and the first and second transformation angles are applied to the first geographic vector to define second and third geographic vectors extending from the geographic positions of the first and second tie points respectively. A geographic position of the unmatched feature can then be determined based on an intersection of the second and third geographic vectors.

That is to say, vectors forming a triangle between the three points in the relative coordinate system are calculated, and the angles between these vectors derived. The triangle formed in the relative coordinate system is then transformed into the geographic coordinate system using the known geographic positions of the two tie points, and the known angular position of the unmatched feature relative to the tie points. In this respect, a first geographic vector between the two tie points is first calculated. A second geographic vector is then calculated that starts at the geographic position of the first tie point and is rotated with respect to the first geographic vector by an angle equal to the first transformation angle. A third geographic vector is then calculated that starts at the geographic position of the second tie point and is rotated with respect to the first geographic vector by an angle equal to the second transformation angle. The point at which the second and third geographic vectors intersect is the geographic position of the unmatched feature. This may be determined in any suitable way, for example, using a standard line intersection calculation.

The known topographic data further may further comprise one or more correction points corresponding to known geographic positions along the route travelled by the vehicle, the one or more correction points providing additional tie points for use in the transforming. This is particularly useful in areas where the data tracked in the relative coordinate system and the geographic coordinate system are both susceptible to high levels of drift In some examples, the route data is obtained by one or more of: an optical sensor, an inertial measurement unit, and a satellite navigation system.

The method may further comprise determining a plurality of geographic positions for an unmatched feature, and calculating an average geographic position of the unmatched feature in dependence thereon. For example, the route may be travelled multiple times, with a new set of route data being obtained each time, from which a new set of geographic positions are calculated. For each feature along the route, an average geographic position may be calculated from geographic position obtained each time the route is travelled. For example, the calculating an average geographic position may comprise performing a clustering algorithm on the plurality of geographic positions. It will be appreciated however that any suitable method of averaging may be used.

A further aspect provides a system comprising a processor, and a computer readable medium storing one or more instruction(s) arranged such that when executed the processor is caused to perform the method described above.

BRIEF DESCRIPTION OF THE DRAWINGS

Further features and advantages will become apparent from the following description of embodiments and aspects described herein, presented by way of example only, and by reference to the drawings, wherein.

DETAILED DESCRIPTION

In summary, aspects described herein provide methods of accurately positioning road feature data through the use of a sparse set of known features. This may be achieved by identifying accurately known features in both geographic space, supplied initially as ground control points (GCPs), and relative space, found in the road data captured by a sensor using SLAM-based techniques, such as an optical sensor, or some other suitable sensor for identifying features along the road. Whilst the following description refers to SLAM data captured by an optical sensor, it will be appreciated that the features along the route may be captured by any other device using SLAM-based techniques or some other suitable sensor that can identify features and determine their relative position. An example of a feature that might be supplied as GCPs are poles and lamp posts. If the feature can be found in both coordinate systems, a tie-point can be created.

Correction points, also known as snap points, can also be added for the correction of roads that have known issues with GPS and SLAM data. These are (x, y) coordinates of points placed at locations on the road that will snap the trajectory data collected by both a GPS and optical sensor to that location. The correction points are intended to be used in locations where there are common issues with the positioning of the data, for example, a banked road or a road passing through a tunnel. Once placed, they are automatically extracted and used within the process on any route driving over the location.

Each feature that has not been matched to a GCP is then transformed into geographic coordinates using at least two tie-points selected based on the time and/or distance along the route, preferably, at least one in front and one behind the vehicle. By working out the angle between the tie-points and the feature in the relative space, a set of line intersection equations can be solved to output the geographic coordinates of the unknown feature.

The newly acquired position data can then be processed and added to a map database, where they can be viewed on a map image alongside data received from other vehicles surveying other route, which each have their own relative coordinate system that needs to be transformed into the geographic space.

As such, aspects described herein provide automatic geo-referencing methods that automatically determine which features identified in the SLAM data correspond to the geographic points that are already known. By using the known positions of the GCPs, sub-metre accuracy can be achieved when transforming the SLAM data into geographic coordinates, greatly improving the utility of the captured road data. That is to say, the geographic position of the features captured by the optical sensor can be identified with less than one metre of error, whereas the GPS data previously used to provide a geographic location of the captured features is usually accurate to within around 10 metres. However, as GPS data is only required for matching the captured features to the known geographic feature, a GPS trajectory wandering off the road for brief periods will not impact the result. Furthermore, the inclusion of correction points allow the geo-referencing method to be applied in areas where both the SLAM and GPS data are experiencing extreme drift or error.

Figure 1:
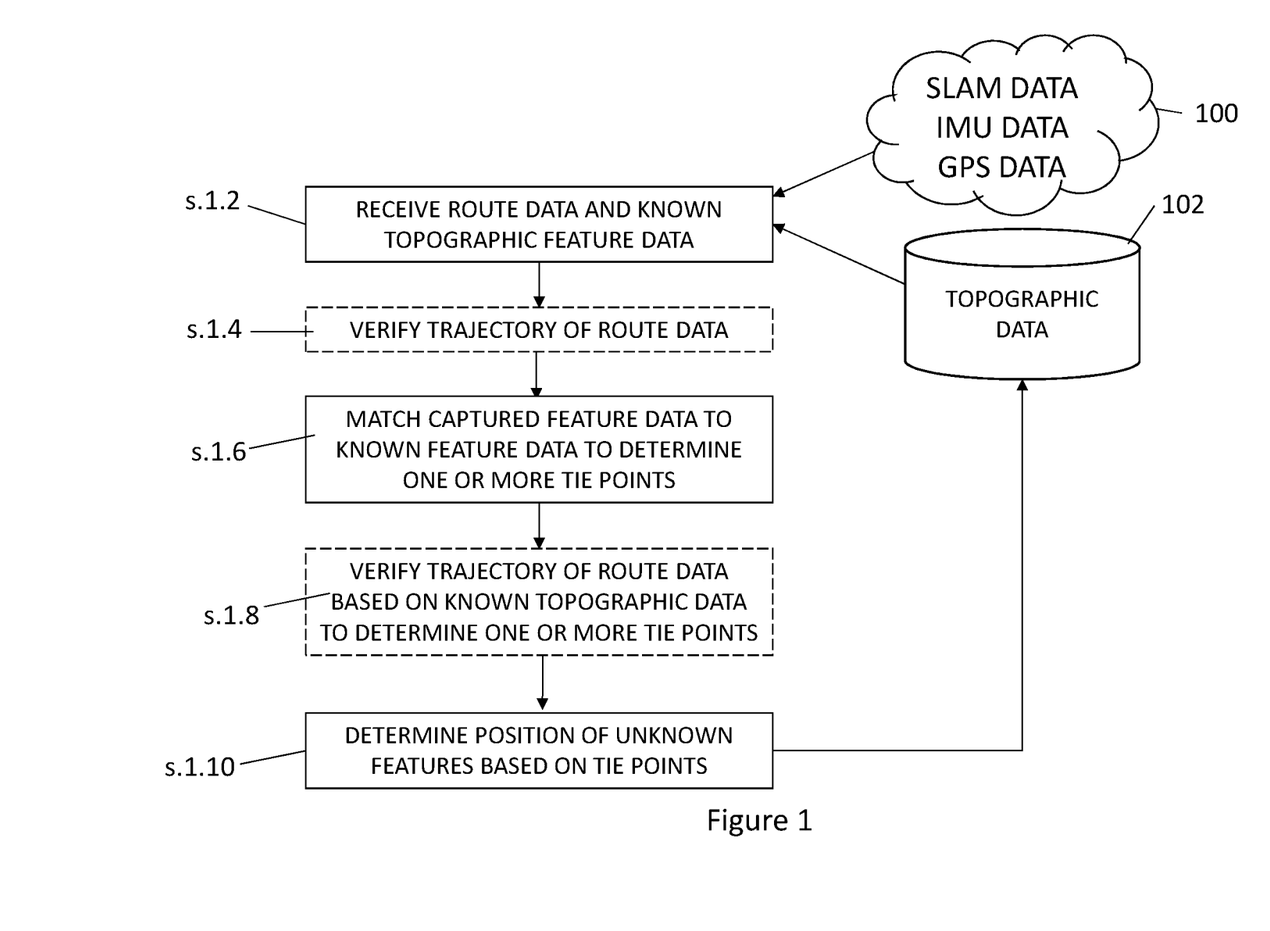
FIG. 1 is a flow diagram illustrating a method of determining position data for road features according to one or more illustrative aspects described herein.

FIG. 1 illustrates a method of positioning automatically captured road feature data, which will now be described with further reference to FIGS. 2 to 6.

In the first step s.1.2, input data relating to the route of the vehicle and known topographic features is received. Firstly, route data 100 is captured in substantially real-time as a vehicle travels along a route. This route data 100 includes data captured using SLAM techniques, usually captured using an optical sensor and referred to hereinafter as SLAM data. In this respect, the optical sensor is used to capture a video or the like, which can then be processed to derive the SLAM data. Specifically, the video is processed to obtain a position and orientation of the vehicle over time, to thereby provide a series of positions defining the trajectory of the vehicle. The video is also processed to identify and extract features along the route. Using the measured position of the vehicle over time, the relative position of the features can also be determined based on the time at which they were captured and the position of the vehicle at that time. The resulting SLAM data therefore includes position data measured using a relative coordinate system, that is, the position data is measured as the position of the optical sensor relative to its starting position (i.e. the origin of the relative coordinate system), with distances typically being measured in metres. The SLAM data also includes a set of feature data captured as the vehicle travels along the route, wherein the feature data comprises the position of the captured features relative to the starting position of the optical sensor, that is, relative to the origin of the relative coordinate system. The features captured by the optical sensor may be any feature located along the road, including but not limited to, road signs, traffic lights, traffic cones, advertisement boards, buildings, other vehicles, trees, lamp posts, telephone poles or any other feature that may be found on or near a road. In this respect, all of the data captured by the optical sensor has a timestamp or a measured distance travelled associated with it so as to track how far along the route the vehicle has travelled, thereby enabling it to measure the relative position of features at each point along the route. The SLAM data described herein may also be supplemented, for example, by IMU data measured by a separate IMU device, in order improve the accuracy of the position data measured in the relative coordinate system. In such cases, an IMU device may also track the position of the vehicle relative to the starting point to output the route trajectory in the relative coordinate system. This can then be used to validate that the route trajectory measured by the SLAM-based sensor.

The route data 100 also comprises geographic position data received from some suitable navigation system, such as a GPS receiver, referred to hereinafter as GPS data, although it would be appreciated that some other form of geographic position data may be used. The GPS data comprises position data of the vehicle in geographic space, for example, by providing the position of the vehicle in a decimal degrees format based on the World Geodetic System.

It will be appreciated that the route data 100 may be captured by a single device, for example, an optical sensor having GPS capabilities, or the route data may be captured by multiple devices, for example, a separate optical sensor and GPS receiver, and in some cases, an additional IMU device.

In addition to the route data 100, known topographic data 102 is also received, for example, topographic data that may be stored in a central topographic database. This known topographic data 102 includes ground control point (GCP) data containing position data for a small set of features that are known to be along the route. This GCP data is a set of (x,y) positions in geographic space corresponding to known features that have been found to high level of accuracy, in some cases, to a centimetre order of magnitude. Such data may be obtained through the use of real-time kinetic (RTK) positioning. The GCP data corresponds to known features that the optical sensor will also capture as part of the SLAM data as the vehicle is driving along the route. An example of such a feature that could be identified is a lamp post. The known topographic data 102 also includes known locations along the route that the vehicle is taken, referred to hereinafter as correction point data. The correction point data is a set of (x, y) points in geographic space corresponding to discrete locations along the route. The correction point data is intended to be used in locations where there are common issues with the positioning of the route trajectory of the vehicle using the usual navigation system, for example, roads that are banked or roads passing under a tunnel.

It will be appreciated that the route data 100 and known topographic data 102 may be received at any suitable time. For example, the route data 100 may be received substantially in real-time as it is captured by the relevant devices on the vehicle as the vehicle travels along the route. Alternatively, the route data 100 may be received for processing once the vehicle has completed the route. Similarly, the known topographic data 102 may be received before, during or after the journey travelled by the vehicle.

Figure 2:
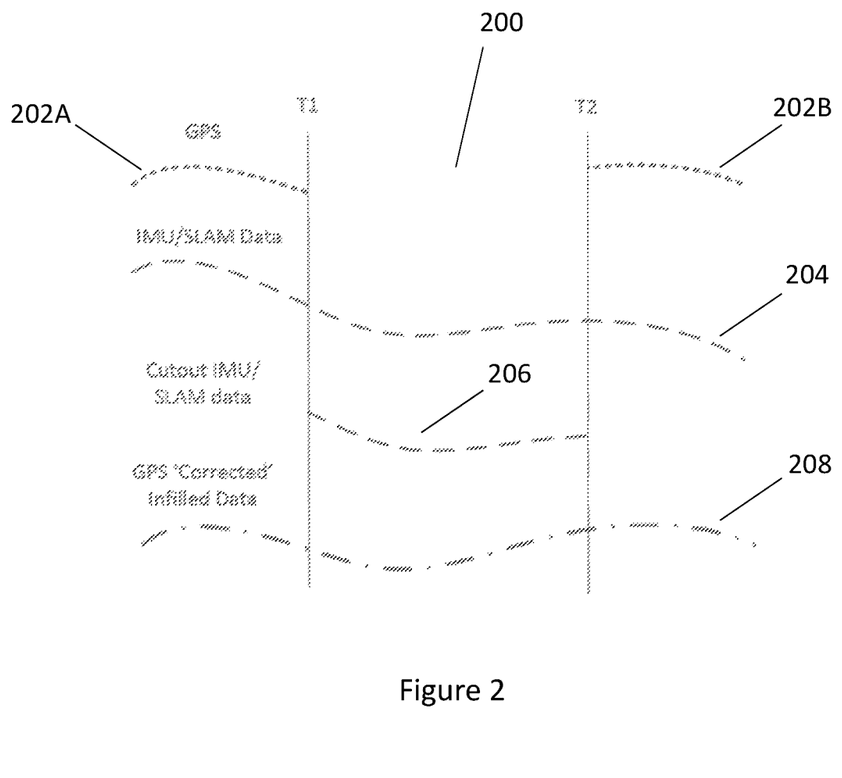
FIG. 2 is a diagram illustrating part of the method according to one or more illustrative aspects described herein.

Once route data and known topographic feature data has been received, the next step is to verify the route trajectory captured within the GPS data and correct any errors if required (s.1.4). To do this, any gaps in the GPS trajectory data, for example, due to a loss of signal, can be filled in using the SLAM data and/or other IMU position data. With reference to FIG. 2 by way of example, the GPS data may have a gap 200 between a first time T1 and a second time T2, with GPS data only being available before T1 and after T2 (202A, 202B). For example, the GPS data may have lost signal between T1 and T2. In contrast, the SLAM and/or IMU position data continuously tracks the route trajectory 204 as the relative distance travelled along the whole route. To resolve the gap 200 in the GPS data, the section of route trajectory 206 tracked by the SLAM and/or IMU position data between T1 and T2 can be extracted and used to fill in the gap 200. The cut out section 206 is transformed to the geographic space and inserted into the gap 200 in the GPS data by aligning the ends of the transformed cut out section 206 with the end points of the known GPS data 202A, 202B at T1 and T2 respectively. For example, the SLAM and/or IMU position data may be transformed from the relative coordinate system to the geographic coordinate system based on the degrees to metre ratio for that location, which enables the relative coordinates to be mapped directly to geographic coordinates given the known set of geographic coordinates 200A, 200B at T1 and T2. As such, a complete route trajectory 208 is obtained, providing constant location of the vehicle in geographic coordinates along the route. The trajectory of the route needs to be known in both relative coordinates and geographic coordinates in order to effectively perform the method described below, and hence it is important that the GPS data does not contain any gaps.

It will of course be appreciated that if the GPS trajectory data does not contain any gaps, then the processing described above with respect to step 1.4 is not required.

Once the GPS route trajectory has been verified and corrected, the next step is to match features that have been captured as part of the SLAM data to any GCPs in the known topographic data 102 (s.1.6). That is to say, some of the features captured along the route will be matched with features that are already known to be on that route, wherein the location of the known features is known to a relatively high degree of accuracy, as discussed above. It does this by transforming the location of the SLAM feature in relative space to a geographic coordinate, and then compares this transformed location to the geographic coordinates of the known GCPs.

Figure 3A:
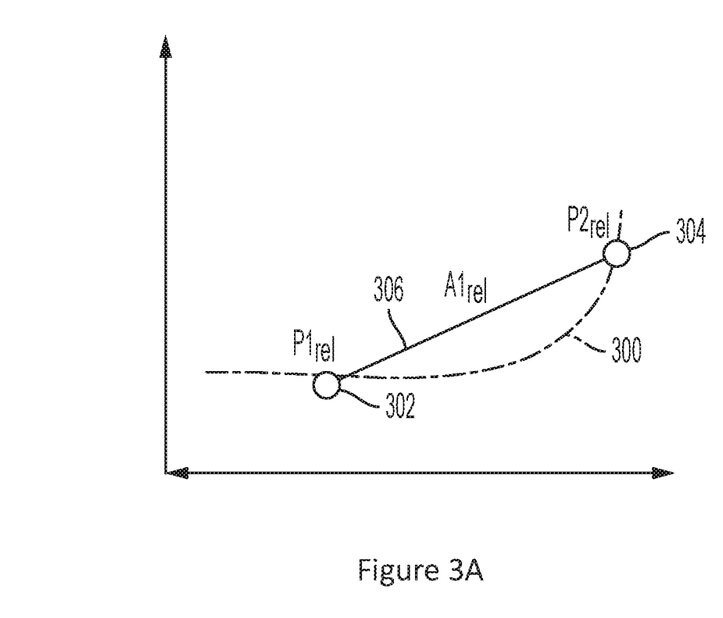
FIGS. 3A-B are diagrams illustrating part of the method according to one or more illustrative aspects described herein.
Figure 3B:
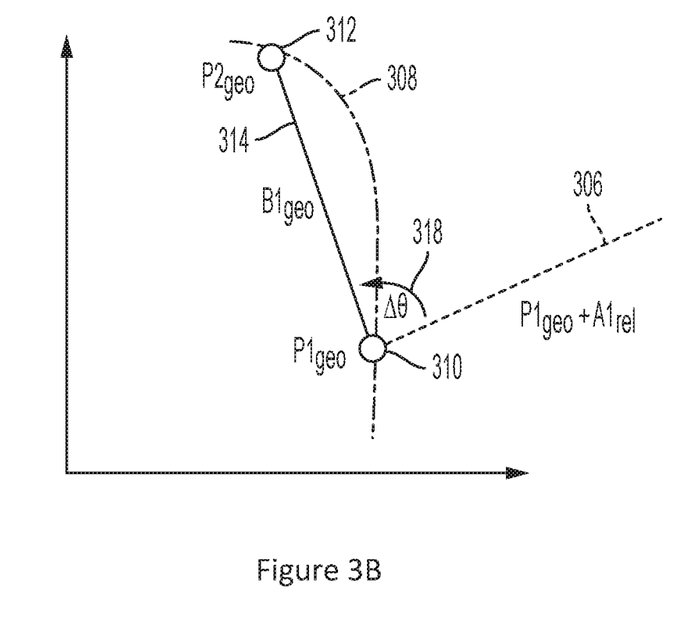

The first stage of this matching step is to calculate the spatial relationship between the two coordinate systems. In this example, the magnitude is taken to be preserved between the two coordinate systems, for example, based on a fixed ratio of metres to degrees, and hence it is the angular difference between the relative coordinate system and the geographic coordinate system that needs to be calculated, as illustrated by FIGS. 3A and 3B. This is done using the route trajectory as it is known in both the relative and geographic space, and hence it is important that the GPS trajectory does not contain any gaps. Here FIG. 3A shows a part of the trajectory 300 using a relative coordinate system, whilst FIG. 3B shows the same part of the trajectory 308 using a geographic coordinate system. If the geographic coordinate system is in a format using the World Geodetic System or the like, then the geographic coordinates should be converted from degrees into meters.

To calculate the angular difference, two positions 302, 304 along the trajectory 300 in the relative space are identified, and a first vector 306 between the two relative positions 302, 304 is calculated. For example, the first relative position 302 may be the relative distance $P1_{rel}$ along the route at the first time T1, the second relative position 304 may the relative distance $P2_{rel}$ along the route at the second time T2, and the vector 306 represents the relative distance and direction $A1_{rel}$ between these two relative positions. Similarly, the same two positions 310, 312 in geographic space are identified, and a second vector 314 between the two geographic positions 310, 312 is also calculated. For example, the first geographic position 310 may be the geographic position $P1_{geo}$ reached at the first time T1 as the vehicle travelled along the route, the second geographic position 312 may the geographic position $P2_{rel}$ reached at the second time T2, and the vector 314 represents the distance and direction $B1_{geo}$ between these two geographic positions.

The angular difference is the angle 318 required to rotate the first vector 306 about the first geographic position 310 to the same orientation as the second vector 314, as illustrated by FIG. 3B. As such, the first vector 306 is applied to the geographic coordinate system such that it extends from the first geographic position 310 corresponding to T1, and then rotated until it has the same direction as the second vector 314, the angle of rotation 318 being the angular difference between the relative coordinate system and the geographic coordinate system. As noted above, this assumes that the magnitude of the first and second vectors 306, 314 is approximately the same.

The aim of this process is to find the angular offset between the SLAM data and GPS data using a sample of GPS data so that at a given time and/or distance travelled, it is known how much rotation difference there is between each consecutive sample. In this respect, once the angular offset between the SLAM data and the GPS data has been found for one small section of the route, then this angular offset can also be applied to other data captured at approximately the same location for identifying and positioning unknown features, as will be described in more detail below. When calculating the angular offset between each consecutive sample along the route, the samples need to be far enough apart to be unaffected by noise, but close enough together to be useful, for example, close enough that it is an accurate representation of drift between the two coordinate systems. For example, if drift becomes significant every 200 metres and noise is around 2 metres, the angular offset may need to be calculated around every 50 to 100 metres. The key is to minimise the gaps between the samples as the GCPs should effectively form a chain along the route. If there are significant gaps, these sections of the route are discarded.

Figure 4A:
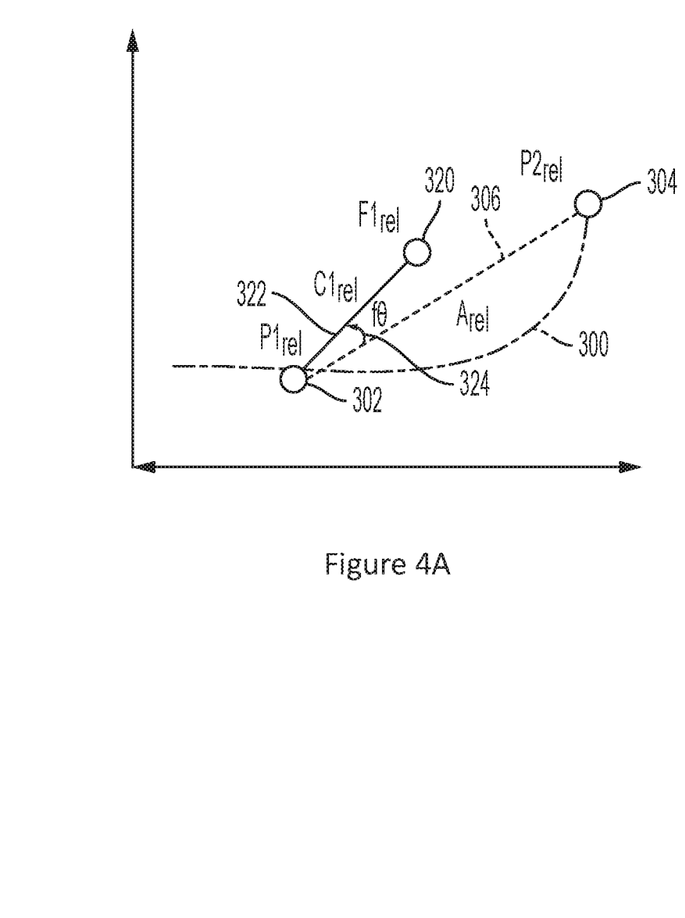
FIGS. 4A-B are diagrams illustrating part of the method according to one or more illustrative aspects described herein.
Figure 4B:
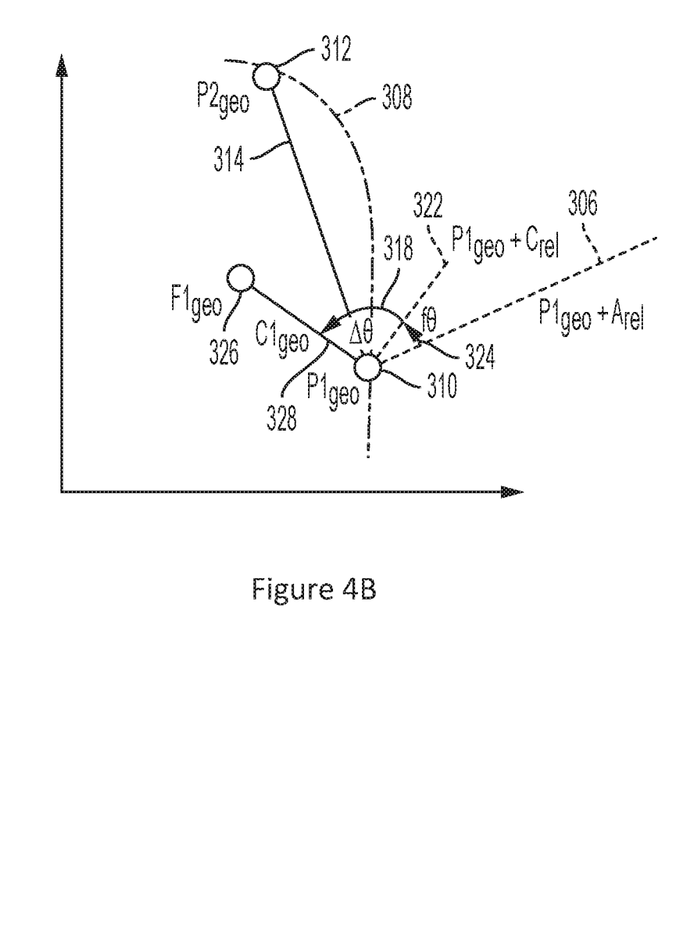

The next stage of the matching step is to transform the features identified in the relative coordinate system of the SLAM data into the geographic coordinate system using the angular offset 318 calculated above. This stage is illustrated by FIGS. 4A and 4B, with FIG. 4A showing the relative coordinate system and FIG. 4B showing the geographic coordinate system. For each feature identified along the route, the position 320 of the feature $F1_{rel}$ in relative space is determined, as shown in FIG. 4A. This is done by identifying the point along the trajectory 300 which correspond to the same time and/or distance travelled by the vehicle, that is, the point along the route at which the feature $F1_{rel}$ was captured. In the present example, the feature $F1_{rel}$ was captured at T1 when the vehicle was at the first relative position 302. A third vector $C1_{rel}$ (labelled 322) can then be calculated from the first relative position 302 to the relative feature position 320, from which the angle 324 between the first vector 306 and the third vector 322 can be determined. The feature angle 324 is approximately preserved between the coordinate systems, and so this can be used to determine the location of the feature in geographic coordinates.

As illustrated by FIG. 4B, the feature angle 324 can be added to the angular difference 318 to thereby give the position 326 of the feature $F1_{geo}$ in geographic coordinates when applied to the first and second geographic positions 310, 312. As before, the third vector 322 is applied to the geographic coordinate system such that it extends from the first geographic position 310, with the angle of rotation relative the first vector 306 being that same as that in the relative coordinate system, that is, the feature angle 324. The third vector 324 is then rotated by the angular difference 318 calculated previously to thereby provide a fourth vector $C1_{geo}$ (labelled 328) between the first geographic position 310 and the geographic position 326 of the feature $F1_{geo}$. As before, it is assumed the magnitude of the third vector 322 is preserved between the coordinate systems, and so rotating the third vector 322 about the first geographic position 310 by the angular difference will provide the approximate position 326 of the feature $F1_{geo}$ in geographic coordinates, to within around 1 to 10 metres.

Once the approximate geographic position 326 of the feature has been determined, it can be compared against the GCPs in the known topographic data 102. If the feature is within a certain threshold of a GCP, it is considered to be the same feature as the GCP. For example, consider a set of GCPs being a series of lamp posts along a road separated by approximately 10 metres. If a feature is within less than 5 metres of one of the lamp posts, it is taken to be that lamp post and not the next lamp post along. This process can be repeated for all of the features identified in the SLAM data. In the event that multiple SLAM features are within the threshold of a GCP, the closest SLAM feature is chosen as the correct feature.

In doing so, the matched GCPs can now be associated with a set of coordinates in relative space, based on the relative coordinates of the SLAM feature with which they have been matched, thereby providing a series of tie points between the two coordinate systems.

The next step is to verify the trajectory of the route data 100 in both relative and geographic coordinate systems based on known topographic data (s.1.8). This step uses correction points, also known as snap points, which are known positions along the route that the vehicle is taken, to verify that the trajectory tracked in the SLAM data and GPS data is correct. This is particularly important for correcting route data in areas that are known to have difficulties, for example, roads passing through a tunnel or single lane roads.

Figure 5:
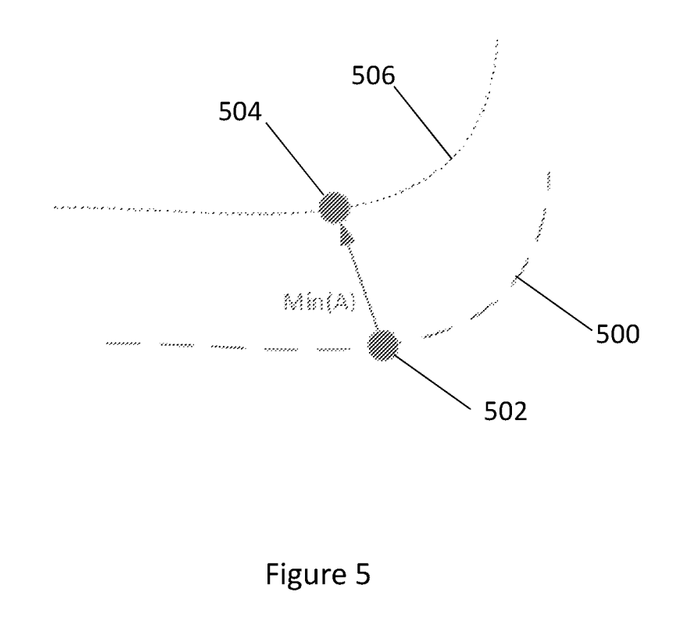
FIG. 5 is a diagram illustrating part of the method according to one or more illustrative aspects described herein.

As illustrated by FIG. 5, this step is performed by identifying the nearest point 502 along the measured route trajectory 500 to a known correction point 504. The route trajectory 500 has both GPS data and SLAM data associated therewith, which are linked by the time and/or distance travelled along the route. As such, the route trajectory 500 has a common link to both coordinate systems. As such, by finding the closest trajectory point 502 to the correction point 504 in geographic coordinates, the time and/or distance travelled can be used to find the equivalent relative coordinates in the SLAM data.

The closest trajectory point 502 in relative space can thus be matched with the geographic correction point 504 to form a new tie-point at the location of the correction point 504, and transform the tracked route trajectory 500 to a corrected route trajectory 506.

Figure 6A:
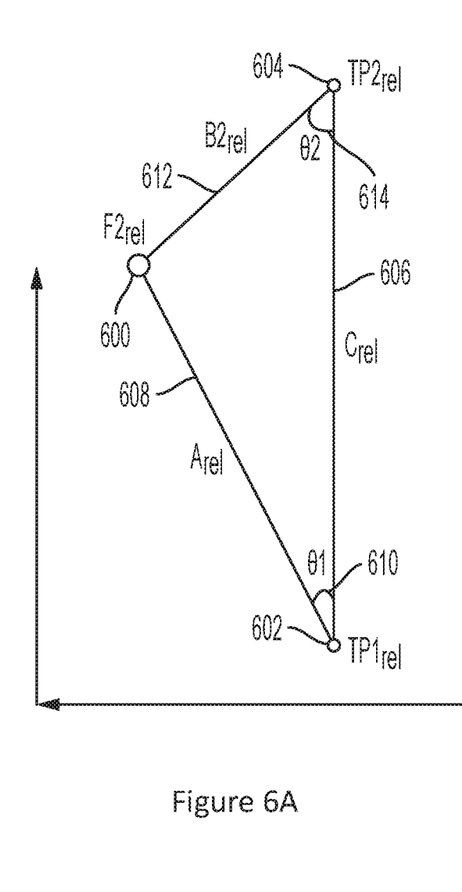
FIGS. 6A-B are diagrams illustrating part of the method according to one or more illustrative aspects described herein.
Figure 6B:
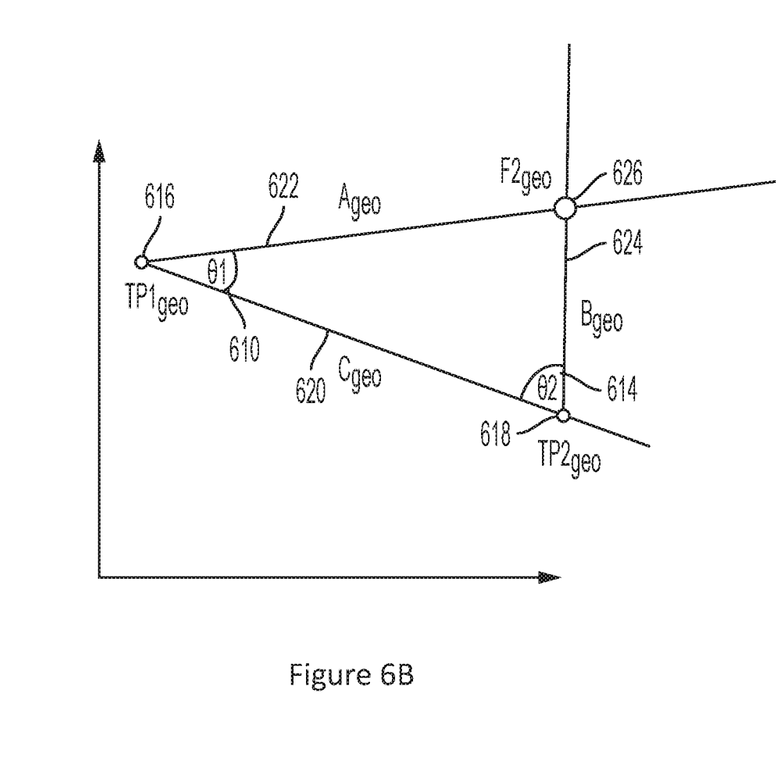

Finally, based on the tie points determined at steps 1.6 and 1.8, the geographic positions of any features that were not identified during the matching process of step 1.6 can be determined (s.1.10), as illustrated by FIGS. 6A and 6B.

For an untransformed feature $F2_{rel}$ (labelled 600), as shown in FIG. 6A, where the position in relative space is already known, the time of capture and/or the distance travelled at the point of capture is used to determine which tie points should be used to transform the position of the unknown feature 600 into the geographic coordinate system. Specifically, a first tie point $TP1_{rel}$ (labelled 602) behind the unknown feature 600 is identified and a second tie point $TP2_{rel}$ (labelled 604) in front of the unknown feature 600 is identified. The tie points used may be any of the tie points identified during steps 1.6 or 1.8. Typically, the tie points selected will be those in closest proximity to the unmatched feature, as these are likely to be the most accurate and have the least amount of drift relative to that unmatched feature. The tie points may also be selected based on their directionality, particularly in the case of correction points where two points may be needed for each side of the road.

To begin, a first relative vector $C2_{rel}$ (labelled 606) between the first tie point 602 and the second tie point 604 is calculated. A second relative vector $A2_{rel}$ (labelled 608) can then be derived using the relative positions of the unknown feature 600 and the first tie point 602, from which the angle of rotation $\theta 1$ (labelled 610) between the first relative vector 606 and the second relative vector 608 can be calculated. Similarly, third relative vector $B2_{rel}$ (labelled 612) can be derived using the relative positions of the unknown feature 600 and the second tie point 604, from which the angle of rotation $\theta 2$ (labelled 614) between the first relative vector 606 and the third relative vector 614 can be calculated.

Assuming that both coordinate systems use the same units (for example, metres), the angles of rotation 610, 614 can then be used to determine the position of the unknown feature in the geographic coordinate system, as shown in FIG. 6B. As discussed above, the geographic positions of the first tie point $TP1_{geo}$ (labelled 616) and the second tie point $TP2_{geo}$ (labelled 618) are already known to a considerable degree of accuracy. As before, a first geographic vector $C2_{geo}$ (labelled 620) between the first and second geographic tie points 616, 618 can be calculated, and the angles of rotation 610, 614 used to derive a second geographic vector $A2_{geo}$ (labelled 622) and a third geographic vector $B2_{geo}$ (labelled 624) respectively. Specifically, the second geographic vector 622 extends from the geographic coordinate of the first tie point 616, rotated with respect to the first geographic vector 620 by an angle equal to the first angle of rotation 610. Similarly, the third geographic vector 624 extends from the geographic coordinate of the second tie point 618, rotated with respect to the first geographic vector 620 by an angle equal to the second angle of rotation 614.

The intersection of the second and third geographic vectors 622, 624 can then be calculated to provide the geographic coordinates of the unknown feature $F2_{geo}$ (labelled 626). This can be done, for example, using a standard 2 dimensional line intersection calculation, with line equations being derived from the known geographic positions of the first and second tie points 616, 618 and directions based on the respective angle of rotation 610, 614. The line equations can then be solved so that the (x,y) coordinates are equivalent, this set of coordinates being the geographic location of the unknown feature 626.

As such, by using tie points identified along the route, the spatial relationship between the relative coordinate system and the geographic coordinate system can be accurately defined, to thereby accurately transform the relative coordinates of unknown features to geographic coordinates. In this respect, step 1.10 may be run for each unknown feature identified along the route that the vehicle is driving.

For each identified feature, the transformed geographic coordinate 626 can then be used to update and/or supplement the stored topographic data 102. For example, the geographic coordinate 626 may be used to update the geographic location associated with a topographic feature already stored in the topographic data 102, or it may be added as the geographic coordinate of a new topographic feature. This new topographic data can thus be used to generate updated topographic map images showing the respective feature in the correct location, and can also be used as tie-points for processing features captured by future surveys.

The above method illustrated by FIG. 1 may be repeated for multiple routes, with each route being repeated a number of times. As such, where a route is driven multiple times, a plurality of transformed geographic coordinates will be calculated for each feature captured along that route. As discussed above, these transformed geographic coordinates may be stored in a topographic database 102, with each route being given its own unique ID to thereby group the topographic data accordingly. For each feature along a route, the transformed geographic coordinates may be populated into clusters from which an average geographic position may be derived, for example, using k-means clustering. As such, as the route is repeated, more geographic position data for each feature is generated, which will act to improve the accuracy of the average geographic position obtained from any sort of clustering analysis. The result is a queryable map database that can be used to generate a topographic map with the majority of road features positioned with sub-metre accuracy.

Figure 7:
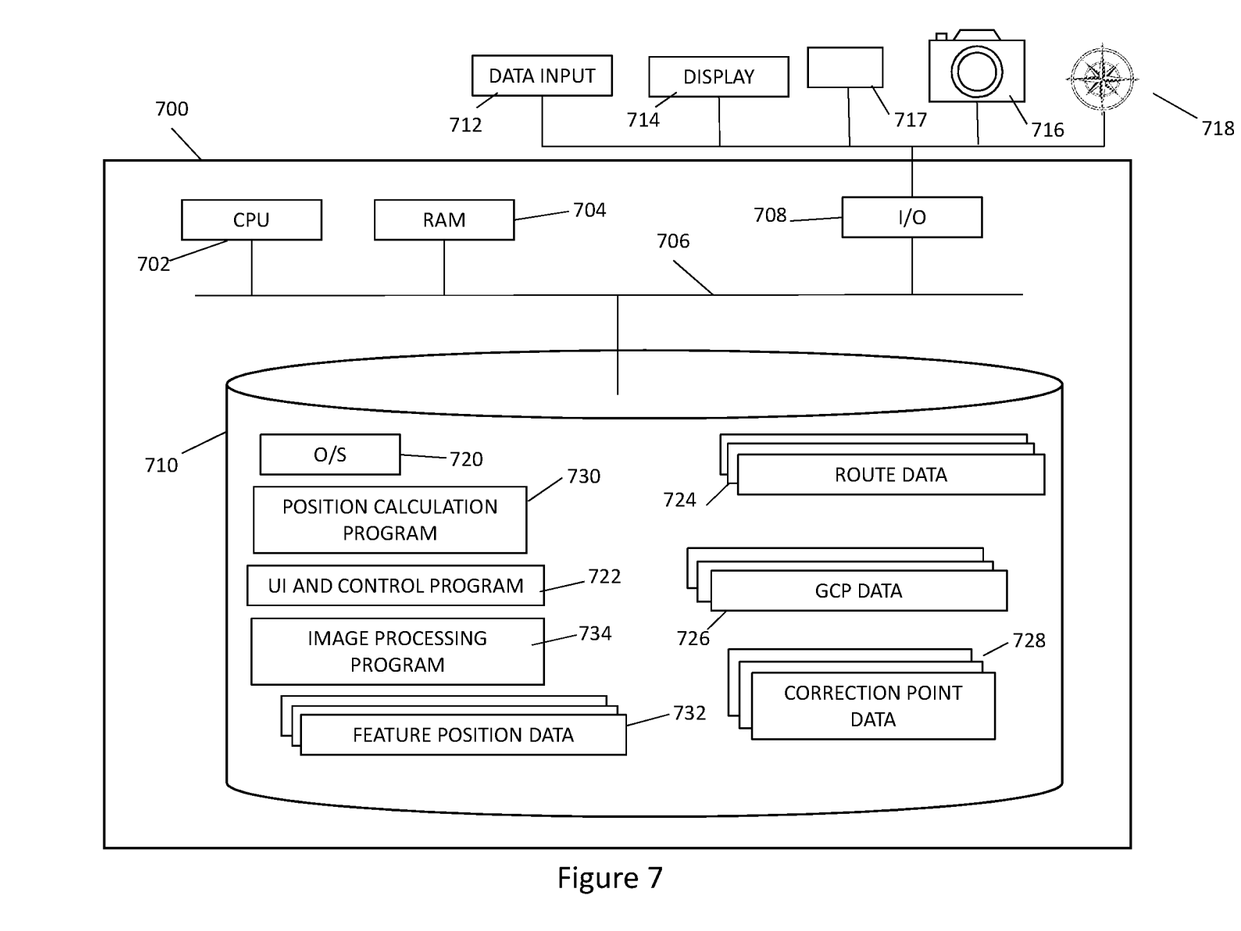
FIG. 7 is a block diagram illustrating a computer system on which one or more illustrative aspects described herein may be implemented.

FIG. 7 illustrates an example of a general computing device 700 that may form the platform for one or more illustrative aspects described herein. The computing device 700 may be located on a vehicle (not shown) that is travelling along a route and capturing road feature data, or the computing device 700 may be located remotely from the vehicle and receiving the relevant data from the vehicle via some wireless network. For example, the computing device 700 may be a mobile phone, a tablet, a wearable computing device, IVI system or the like. In this example, the computing device 700 comprises a central processing unit (CPU) 702 and a working memory 704, connected by a common bus 706, and having an input-output (I/O) interface 708 arranged to receive control inputs from a user via a device connected to a data input port 712 such as a keyboard, mouse, touchscreen, push button, or other controller, and provide output information via a user interface which is displayed on a visual display device 714 connected to the computing device 700. The I/O interface 708 is also arranged to receive further inputs via various other devices and sensors, including but not limited to an optical sensor 716, an inertial measurement unit (IMU) 717 and a satellite navigation system 718 located on the vehicle, wherein the inputs may be received via a wireless or wired connection. Whilst FIG. 7 shows an optical sensor 716, it will again be appreciated that any suitable sensor configured for SLAM based sensing may be used, or some other sensor that is capable of tracking relative position. Similarly, whilst a separate satellite navigation system 718 is shown, it will be appreciated that the system may use an optical sensor 716 or other SLAM based sensor that has GPS capabilities or the like.

The computing device 700 is also provided with a computer readable storage medium 710 such as a hard disk drive (HDD), flash drive, solid state drive, or any other form of general-purpose data storage, upon which stored data, such as route data 724, GCP data 726, correction point data 728 and feature position data 732, and various other programs are arranged to control the computing device 700 to operate in accordance with embodiments and aspects described herein. For example, stored on the computer readable storage medium 710 is an operating system program 720 that when run by the CPU 702 allows the system to operate. Also provided is a position calculation program 730 which implements the positioning method according to one or more aspects described herein when run by the CPU 702, as will be described in more detail below. An image processing program 734 may also be provided for processing a video or the like from the optical sensor to thereby derive the SLAM based data. In order to interface with and control the position calculation program 730 and image processing program 734, a user interface and control program 722 is also provided, that controls the computing device 700 to provide a visual output to the display 714, and to receive user inputs via any input means connected to the data input port 712, or any other device connected to the I/O interface 708 in order to control the position calculation program 720 and image processing program 734.

The computing device 700 is capable of performing a method of road feature identification and positioning according to one or more illustrative aspects described herein, which will now be described.

As described previously, the optical sensor 716 and satellite navigation system 718 collects data using SLAM techniques and geographic position data as the vehicle on which they are located travels along a route. This is received by the computing device 700 and stored as route data 724 on the computer readable storage medium 710. As described previously, the optical sensor 716 will capture a video or the like, which will then be processed to derive the SLAM based route data. In this respect, the video may be processed externally, for example, on board the vehicle, to derive the SLAM data, which may then be input directly to the computing device 700 as stored as the route data 724. Alternatively, the video may be input to the computing device 700, where it may be processed by image processing program 734 and route data 724 output therefrom. In either case, the video may be processed in real-time as it is captured, or after the vehicle has completed the route. The computer readable storage medium 710 also contains known topographic data in the form of a stored set of GCP data 726 and correction point data 728. Once the computing device 700 has the route data 724, the position calculation program 730 can extract the relevant GCP data 726 and correction point data 728 for the given geographic area and perform the method described by steps 1.2 to 1.10 of FIG. 1 to identify features along the route and calculate the geographic positions thereof, to thereby generate feature position data 732. As described previously, this feature position data 732 may be output directly to a user for use in updating a topographic map database, or it may be used to generate an updated map image output to a user via the visual display 714.

Figure 8:
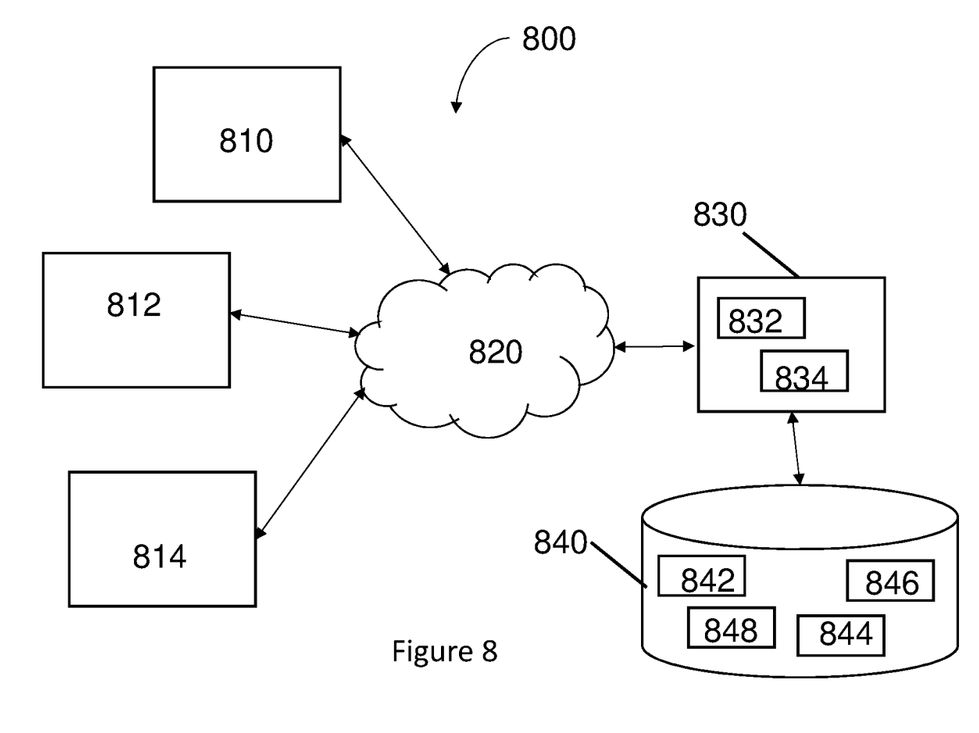
FIG. 8 is a block diagram illustrating a system on which one or more illustrative aspects described herein may be implemented.

FIG. 8 illustrates one example of a use case. Generally, the system described below implements the method described in detail above, and reference should be made to the above when considering the various steps and processes described below.

FIG. 8 shows a system 800 comprising a map server 818 in communication with vehicle servers 810, 812, 814 via a network 816, for example, through a communications interface 834. In this example, the vehicle servers 810, 812, 814 are the servers on which various devices are running. For example, the devices running on the vehicle servers 810, 812, 814 may include a computing device, such as that shown in FIG. 7, and other on-board devices, such as an optical sensor, an IMU device and a satellite navigation system. The computing device may be located on a vehicle that is travelling along a route capturing road feature data through the use of the optical sensor and satellite navigation system, whilst the on-board computing device calculates the position of the captured features in accordance with the method described above. Alternatively, a computing device may be located remote from the vehicle, and be configured to receive data from the optical sensor, IMU device and satellite navigation system via a wireless network.

The map server 830 comprises a processor 832 arranged to carry out computing operations, and is also in communication with a core server 840. The core server 840 runs different software implemented modules which carry out different tasks or provide particular data when required by the processor 832. More specifically, the core server 840 comprises a topographic database module 842 containing the underlying topographic map data. In some examples, the map server 830 may receive feature position data from one or more of the vehicle servers 810, 812, 814 via the network 820, which is then input to the topographic database module 842 in order to update the underlying topographic map data. The updated topographic map data may then be communicated back to the server 820, where it may be distributed to third parties and/or used to generate an updated map image for display on a visual display (not shown). Where multiple sets of feature position data relating to the same route is being received from one or more of the vehicle servers 810, 812, 814, the core server may comprises a clustering program 844 configured to perform clustering analysis of the feature position data to thereby determine the average geographic position of each identified feature.

In another example, the map server 830 may receive route data directly from an optical sensor and satellite navigation system of a vehicle via a vehicle server 810, 812, 814, which is then input to the core server 840 in order to calculate the geographic position of identified features as described herein. The core server 840 may therefore comprise a position calculation module 846 configured to calculate the geographic position of features in accordance with steps 1.2 to 1.10 of FIG. 1. In this respect, on receipt of route data from a vehicle server 810, 812, 814, the core server 840 may extract the relevant GCP data and correction point data from the topographic database module 842 and input the route data, GCP data and correction point data into the position calculation module 846 for calculating the geographic position of unknown features as described herein. The resulting position data may then be output and used to update the topographic map data stored in the topographic database module 842 as described previously. The resulting position data or the updated topographic map data then be communicated back to the server 820, where it may be distributed to third parties and/or used to generate an updated map image for display on a visual display. As before, if multiple position data is calculated for the same route, the position data may be input to the clustering program 844 to thereby determine the average geographic position of each identified feature.

In some cases, the map server 830 may receive the video captured along the route directly from the optical sensor, which may then be input to an image processing module 848 of the core server 840 in order to derive the route data for use in calculating position, as described above.

Various modifications, whether by way of addition, deletion and/or substitution, may be made to all of the above described embodiments and aspects to provide further embodiments and aspects, any and/or all of which are intended to be encompassed by the appended claims.

The invention claimed is:

1. A computer-implemented method of determining a geographic position of a feature identified along a route travelled by a vehicle, the method comprising:
receiving a set of route data obtained as the vehicle travels along the route, comprising:
a first route trajectory of the vehicle measured in a relative coordinate system;
a second route trajectory of the vehicle measured in the geographic coordinate system; and
a plurality of features having a position measured in the relative coordinate system;
determining a spatial relationship between the relative coordinate system and the geographic coordinate system, wherein the spatial relationship is determined in dependence on a part of the first route trajectory and a part of the second route trajectory, wherein the part of the first route trajectory and the part of the second route trajectory are both measured between a first time and a second time;
receiving known topographic data comprising one or more known topographic features having a known position measured in a geographic coordinate system;
matching one or more features in the route data to one or more of the known topographic features in dependence on the determined spatial relationship to determine at least two tie points between the relative coordinate system and the geographic coordinate system; and
transforming a position of one or more unmatched features in the route data from the relative coordinate system to the geographic coordinate system in dependence on the at least two tie points to thereby determine a geographic position of the one or more unmatched features.

2. A method according to claim 1, wherein the determining the spatial relationship comprises calculating an angular offset between the part of the first route trajectory and the part of the second route trajectory.

3. A method according to claim 2, wherein the matching comprises:
transforming a position of a feature in the relative coordinate system to a position in the geographic coordinate system based on the angular offset; and
comparing the position in the geographic coordinate system to the known positions of the one or more known topographic features.

4. A method according to claim 2, wherein the calculating the angular offset comprises:
calculating a first vector between a first relative position on the part of the first trajectory corresponding to the first time and a second relative position on the part of the first trajectory corresponding to the second time;
calculating a second vector between a first geographic position on the part of the second trajectory corresponding to the first time and a second geographic position on the part of the second trajectory corresponding to the second time;
adding the first vector to the first geographic position; and
calculating an angle of rotation between the first and second vector.

5. A method according to claim 4, wherein the matching further comprises:
calculating a third vector between the first relative position and a feature corresponding to a third relative position;
adding the third vector to the first geographic position;
rotating the third vector about the first geographic position by the angle of rotation; and
determining a geographic position of the feature based on a magnitude of the third vector in the rotated orientation.

6. A method according to claim 1, wherein the method further comprises:
identifying a gap in the second route trajectory, the gap corresponding to a first time duration;

identifying a portion of the first route trajectory corresponding to the first time duration; and resolving the gap in the second route trajectory based on the portion of the first route trajectory.

7. A method according to claim 1, wherein the transforming comprises identifying a first tie point and a second tie point in proximity to an unmatched feature, wherein the unmatched features is located between the first and second tie points in the direction of at least one axis of the relative coordinate system, and wherein a position of the first tie point and the second tie point is known in both the relative coordinate system and the geographic coordinate system.

8. A method according to claim 7, wherein the transforming comprises:
 calculating a further spatial relationship between the unmatched feature and the positions of the first and second tie points in the relative coordinate system;
 applying the further spatial relationship to the positions of the first and second tie points in the geographic coordinate system; and
 determining a geographic position of the unmatched feature in dependence thereon.

9. A method according to claim 7, wherein the transforming further comprises:
 calculating a first transformation vector between the unmatched feature and a relative position of the first tie point, a second transformation vector between the unmatched feature and a relative position of the second tie point, and a third transformation vector between the relative positions of the first and second tie points;
 calculating a first transformation angle between the first transformation vector and the third transformation vector;
 calculating a second transformation angle between the second transformation vector and the third transformation vector;
 calculating a first geographic vector between a geographic position of the first tie point and a geographic position of the second tie point;
 applying the first and second transformation angles to the first geographic vector to define second and third geographic vectors extending from the geographic positions of the first and second tie points respectively; and
 determining a geographic position of the unmatched feature based on an intersection of the second and third geographic vectors.

10. A method according to claim 1, wherein the known topographic data further comprises one or more correction points corresponding to known geographic positions along the route travelled by the vehicle, the one or more correction points providing additional tie points for use in the transforming.

11. A method according to claim 1, wherein the route data is obtained by one or more of: an optical sensor, an inertial measurement unit, and a satellite navigation system.

12. A method according to claim 1, wherein the method further comprises:
 determining a plurality of geographic positions for an unmatched feature; and
 calculating an average geographic position of the unmatched feature in dependence thereon.

13. A method according to claim 12, wherein the calculating an average geographic position comprises performing a clustering algorithm on the plurality of geographic positions.

14. A system comprising:
 a processor; and
 memory storing one or more computer readable instructions that, when executed by the processor, configure the system to:
 receive a set of route data obtained as a vehicle travels along a route, comprising:
  a first route trajectory of the vehicle measured in a relative coordinate system;
  a second route trajectory of the vehicle measured in the geographic coordinate system; and
  a plurality of features having a position measured in the relative coordinate system;
 determine a spatial relationship between the relative coordinate system and the geographic coordinate system, wherein the spatial relationship is determined in dependence on a part of the first route trajectory and a part of the second route trajectory, wherein the part of the first route trajectory and the part of the second route trajectory are both measured between a first time and a second time;
 receive known topographic data comprising one or more known topographic features having a known position measured in a geographic coordinate system;
 match one or more features in the route data to one or more of the known topographic features in dependence on the determined spatial relationship to determine at least two tie points between the relative coordinate system and the geographic coordinate system; and
 transform a position of one or more unmatched features in the route data from the relative coordinate system to the geographic coordinate system in dependence on the at least two tie points to thereby determine a geographic position of the one or more unmatched features.

15. A system according to claim 14, wherein the instructions, when executed by the processor, further configure the system to calculate an angular offset between the part of the first route trajectory and the part of the second route trajectory to determine the spatial relationship between the relative coordinate system and the geographic coordinate system.

16. A system according to claim 15, wherein the instructions, when executed by the processor, further configure the system:
 transform a position of a feature in the relative coordinate system to a position in the geographic coordinate system based on the angular offset; and
 compare the position in the geographic coordinate system to the known positions of the one or more known topographic features.

17. A system according to claim 15, wherein the instructions, when executed by the processor, further configure the system:
 calculate a first vector between a first relative position on the part of the first trajectory corresponding to the first time and a second relative position on the part of the first trajectory corresponding to the second time;
 calculate a second vector between a first geographic position on the part of the second trajectory corresponding to the first time and a second geographic position on the part of the second trajectory corresponding to the second time;
 add the first vector to the first geographic position; and
 calculate an angle of rotation between the first and second vector.

18. A system according to claim 17, wherein the instructions, when executed by the processor, further configure the system:

calculate a third vector between the first relative position and a feature corresponding to a third relative position;
add the third vector to the first geographic position;
rotate the third vector about the first geographic position by the angle of rotation; and
determine a geographic position of the feature based on a magnitude of the third vector in the rotated orientation.

* * * * *